United States Patent
Pan

(10) Patent No.: US 8,487,230 B2
(45) Date of Patent: Jul. 16, 2013

(54) INTELLIGENT SOLAR ENERGY COLLECTION SYSTEM WITH A DEDICATED CONTROL DEVICE

(76) Inventor: Yang Pan, Shanghai (CN)

( * ) Notice: Subject to any disclaimer, the term of this patent is extended or adjusted under 35 U.S.C. 154(b) by 0 days.

(21) Appl. No.: 13/607,724

(22) Filed: Sep. 8, 2012

(65) Prior Publication Data

US 2012/0330471 A1   Dec. 27, 2012

Related U.S. Application Data

(62) Division of application No. 12/571,440, filed on Oct. 1, 2009.

(51) Int. Cl.
*F24J 2/38* (2006.01)
(52) U.S. Cl.
USPC ..................................... 250/203.4
(58) Field of Classification Search
USPC ............................. 250/203.4; 136/244–246
See application file for complete search history.

(56) References Cited

U.S. PATENT DOCUMENTS

| | | |
|---|---|---|
| 4,031,385 A | 6/1977 | Zerlaut et al. |
| 4,223,214 A | 9/1980 | Dorian et al. |
| 4,297,572 A | 10/1981 | Carlton |
| 4,445,030 A | 4/1984 | Carlton |
| 4,794,909 A | 1/1989 | Eiden |
| 6,239,353 B1 | 5/2001 | Hall et al. |
| 6,284,968 B1 | 9/2001 | Niesyn |
| 6,552,257 B1 | 4/2003 | Hart et al. |
| 6,960,717 B2 | 11/2005 | Stuart et al. |
| 7,105,940 B2 | 9/2006 | Weesner et al. |
| 8,129,667 B2 * | 3/2012 | Moore et al. ............... 250/203.4 |
| 2003/0172922 A1 | 9/2003 | Haber |
| 2006/0162772 A1 | 7/2006 | Presher, Jr. et al. |
| 2007/0103108 A1 | 5/2007 | Capp et al. |
| 2008/0011288 A1 | 1/2008 | Olsson |
| 2008/0087321 A1 | 4/2008 | Schwartzman |
| 2009/0188488 A1 | 7/2009 | Kraft et al. |

* cited by examiner

*Primary Examiner* — Seung C Sohn

(57) ABSTRACT

A solar energy collection system comprises a plurality of solar panels and a control device. The panel further comprises a plurality of solar modules, a supporting, pivoting and tilting mechanism, a controller and a short range communication unit. The control device comprises an orientation detector for determining the optimized orientation of a panel towards the sun for receiving maximum sun radiation. The control device further comprises a communication unit. The optimized orientation determined by the control device may be transmitted to the solar panels through an ad hoc communication network.

11 Claims, 7 Drawing Sheets

INTELLIGENT SOLAR ENERGY COLLECTION SYSTEM WITH A DEDICATED CONTROL DEVICE

CROSS-REFERENCE TO RELATED APPLICATIONS

This application is a division of the application Ser. No. 12/571,440.

BACKGROUND

1. Field of Invention

This invention relates to solar energy collection, specifically to a system and method of maximizing solar energy collection from a solar panel array.

2. Description of Prior Art

In recent years, concerns have been raised that high demand for electricity taxing the capacity of existing electricity generating plants. Furthermore, concerns regarding the availability and environmental safety of fossil and nuclear fuel are being raised. As a result of the above factors, the price of electricity has been on a path of steady increasing. It has become increasing common to seek for alternative energy sources. One such energy source is the sun. Solar panels have been available for many years for the purpose of converting the energy from sun radiation into electricity. The collected energy is thereafter often stored in some sort of energy storage apparatus and used for heating homes, water suppliers, and powering various electrical devices. The collected energy in a form of DC (Direct Current) electricity may also be injected into a power grid after it is converted into AC (Alternative Current) electricity by an inverter.

In order for the solar panel to receive as much solar energy as possible for conversion into electricity, it is desirable to mount the solar panel on an adjustable support apparatus that allows for variably orienting the solar panel relative to the general position of the sun. Many existing devices generally provide for tilting and rotation of the panel. Tilting of the panel is generally provided by a pivotal connection at the bottom of the panel and a drive mechanism of some sort, with the panel bottom either directly hinged to a base of some sort or hingedly connected to a rigid non-extendable linkage. Several of these devices also provide for rotation of the panel. The rotation is usually provided by separately rotating the support apparatus such as a pole or a plate for the entire panel.

As the sun moves across the sky from sunrise to sunset, it is desirable that the orientation of the solar panel is changed accordingly by the pivoting and tilting mechanism of the support apparatus to maintain an optimized position for generating highest electricity from the sun radiation.

A clock mechanism has been employed to control the orientation of the panel. To compensate for the compound movement of the sun, daily from horizon to horizon, and seasonally with a progressing season elevation, the clock mechanism must be elaborate and therefore expensive.

Sensors such as illumination detectors have also been employed to derive the position of the sun. U.S. Pat. No. 4,297,572 to Carlton disclosed a solar energy collector assembly including a solar panel mounted for movement along a predetermined tracking path in order to maintain a predetermined orientation with respect to the sun. The disclosed assembly also includes a specific solar tracking sensor. There are many problems associated with the use of illumination detectors in the tracking mechanism including shadowing of the detector by a cloud in the sky.

A solar panel array comprising a multiple solar panels connected together in series and/or in parallel has recently become more and more popular, in particularly, for use as a power generation plant. It is important that the array generates highest possible electrical power to speed up the return on investment (ROI). Low cost wireless communication network has been proposed to enhance the operation efficiency of the array.

In US patent publication 2008/0087321 by Schwartzman, a solar energy generator module is disclosed including a modular photovoltaic array, sensors, controller and communication means for monitoring and communicating a variety of physical parameters from each module to a centralized computer. The collected information can be utilized to monitor module health for maintenance purposes, and also be used as a position input for the primary servomechanism control algorithm.

In US patent publication 2009/0188488 by Kraft et al., an apparatus for networking solar tracking devices is disclosed. The system includes one or more solar tracking devices, each comprising a tracking controller. Tracking controllers form a wireless mesh communication network managed by a network manager. Tracking controller receives operation data from and sends monitor data to a host computer.

The potential to increase the efficiency of the solar array by employing a low cost communication network connectable to the Internet, however, has not yet been fully explored. It is desirable to have an intelligent solar panel array which can maximize the generated electricity with acceptable cost.

SUMMARY OF THE INVENTION

It is therefore an object of the present invention to provide a novel solar energy collection system for generating highest electrical power from the sun radiation with a dedicated control device comprising an orientation detector for determining the optimized orientation for a panel to receive maximum sun radiation and a communication device.

A solar panel comprises a plurality of solar modules installed on an apparatus with a supporting, pivoting and tilting mechanism, a controller, and a communication device. A solar panel array is formed by a number of solar panels connected in a predetermined scheme. The solar panel array may be connected to a power grid through an inverter.

According to one embodiment of the present invention, the control device is a dedicated device comprising an illumination detector installed on a top surface of a panel. The illumination detector may be a solar module. The panel may be supported by an apparatus with a pivoting and titling mechanism. The panel may be substantially smaller in size in comparison to a typical solar panel. According to one aspect of the present invention, the optimized orientation for the panel is determined by pivoting and/or tilting the panel to multiple positions in a sequential manner. At each position, the generated DC current and voltage is measured by a measurement unit. The maximum power point is then determined based upon the measured results. The optimized position for generating of the highest electrical power is then decided by comparing all recorded maximum power at each position.

Communication devices from the solar panels and from the control device form an ad hoc communication network. The control device may have another communication means for connecting directly to a server (host computer) through an existing communication network such as the Internet. The optimized position determined by the control device may be sent to all solar panels through the communication network. All panels are adjusted to the optimized position for generating the highest electrical power. The described method may be repeated in a predetermined frequency during the daytime.

BRIEF DESCRIPTION OF THE DRAWINGS

For a more complete understanding of the present invention and its various embodiments, and the advantages thereof, reference is now made to the following description taken in conjunction with the accompanying drawings.

DETAILED DESCRIPTION

The present invention will now be described in detail with references to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

Figure 1:
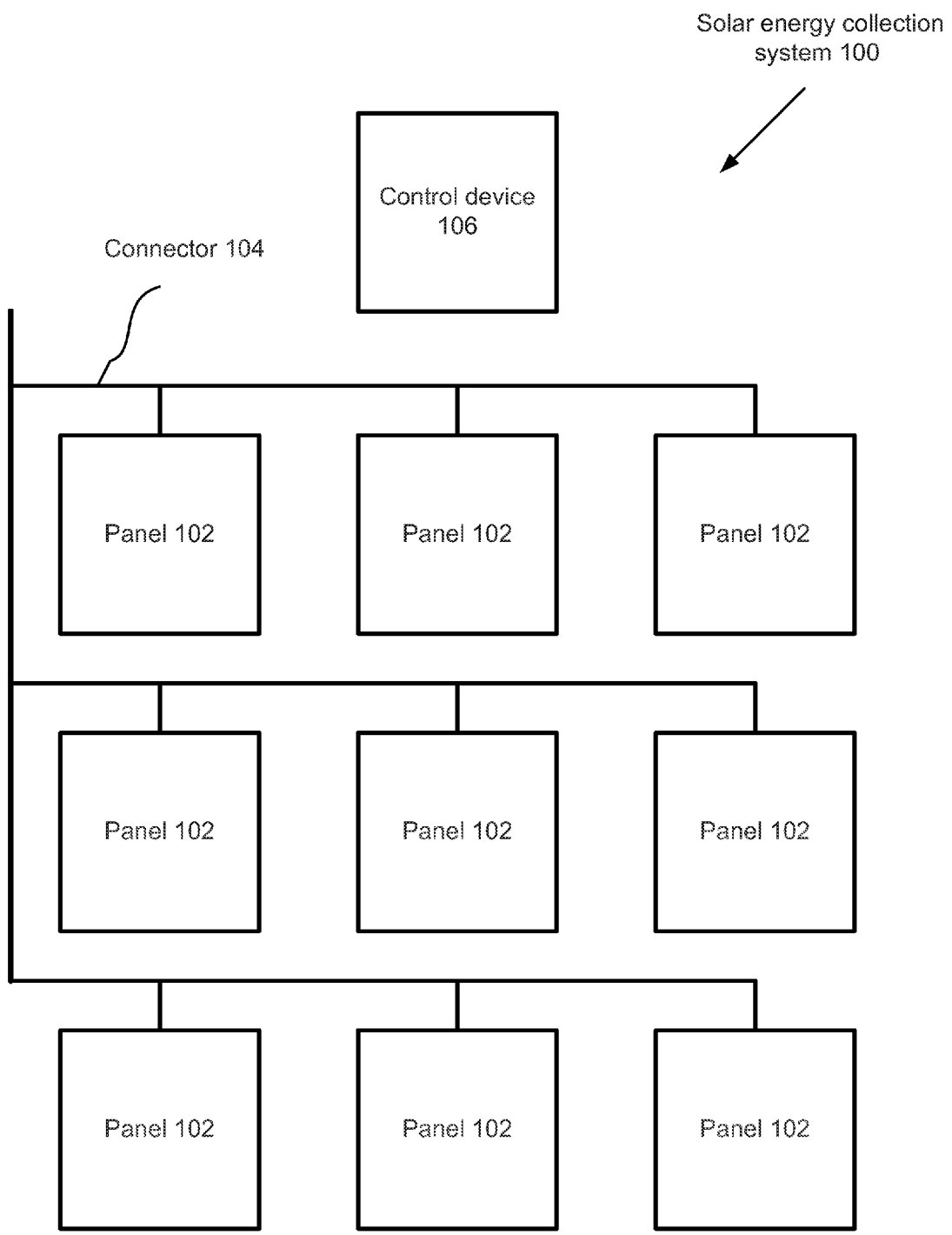
FIG. 1 is a schematic diagram of a solar energy collection system comprising a solar panel array and a control device.

FIG. 1 is a schematic diagram of a solar energy collection system 100. The system 100 comprises a plurality of panels 102 connected by a connector 104. Although the panels are connected in a parallel manner as illustrated in an exemplary case, the panels can be connected in any configuration in a combination of in series and/or in parallel to generate a desired DC current and voltage. The system 100 comprises a control device 106 including a means of determining the optimized orientation of the panel towards the sun for receiving the maximum radiation. The control device 106 is also severed as a communication gateway for connecting the system 100 to a server in an existing communication network such as the Internet. The generated DC electricity by the system 100 may be converted into AC electricity by an inverter and is subsequently injected into a power grid. The generated DC electricity may also be used directly to power electrical appliances or be stored in an energy storage apparatus such as a battery.

Figure 2:
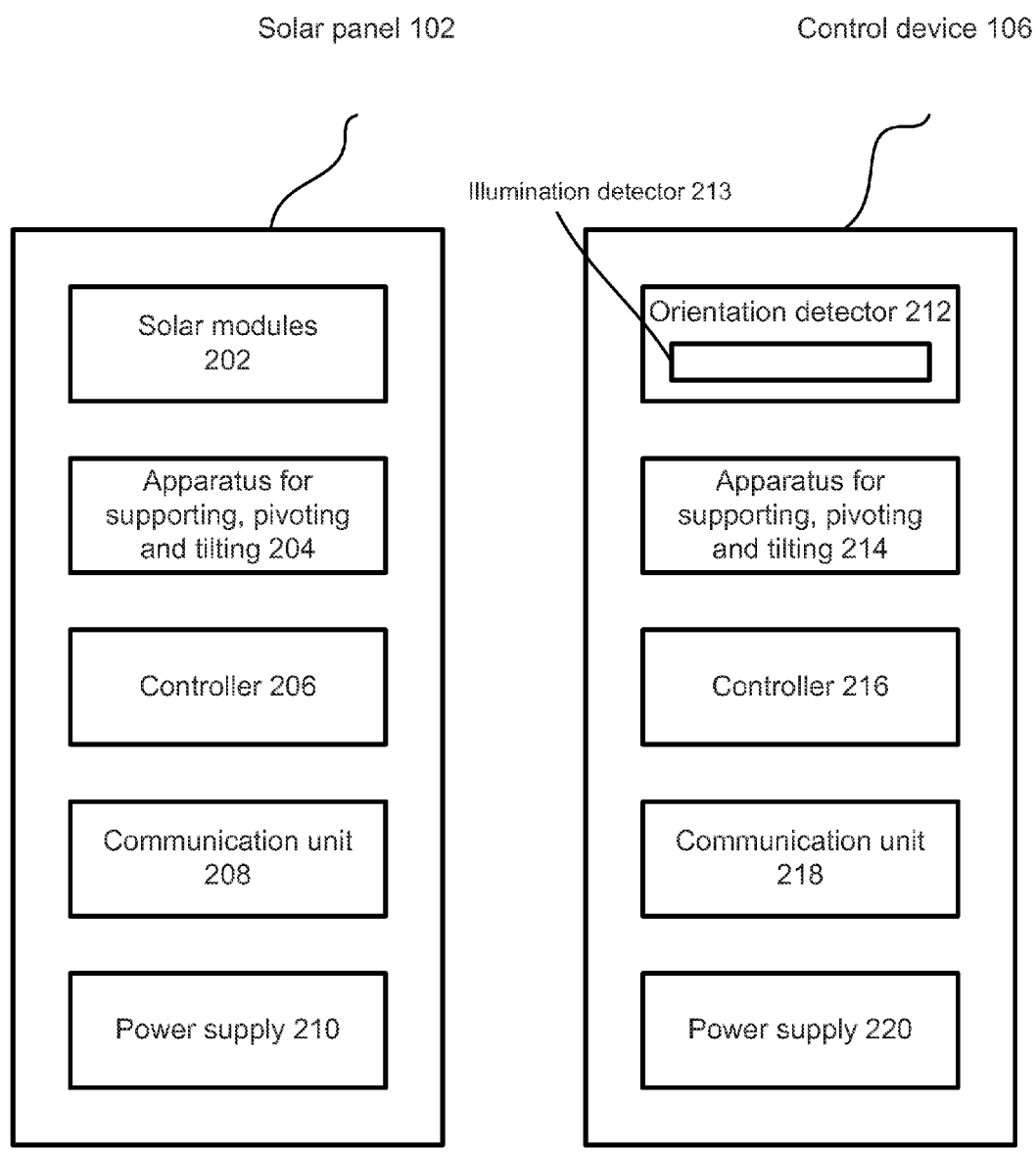
FIG. 2 is a functional block diagram of an exemplary solar panel and a control device.

FIG. 2 is a functional block diagram of the solar panel 102 and the control device 106. The panel 102 comprises a plurality of solar modules 202 connected in a predetermined manner in series and/or in parallel. Each module may further comprise a plurality of solar cells connected in series and/or in parallel. Solar modules 202 are installed on an apparatus 204 that provides a structural support for 202 and also provides a mechanism for pivoting and/or tilting the panel with a drive mechanism. The solar panel 102 further comprises a controller 206. According to one implementation, the controller 206 includes a microprocessor. A communication unit 208 is used for communicating with the control device 106 and/or communicating with other solar panels 102. According to one embodiment, 208 is a short range communication device that may conform to various short range communication standards such as Bluetooth (IEEE 802.11b and its amendments), Zigbee (IEEE 802.15.4 and its amendments) and WiFi (IEEE 802.11 and its amendments). The operation of the panel may be powered by a power supply 210. 210 may be a battery. The battery may be rechargeable by the solar modules 202. The power supply 210 may also be the solar modules 202 or at least a portion of 202.

The control device 106 comprises an orientation detector 212, an apparatus 214 for supporting, pivoting and/or tilting a panel, a controller 216, a communication unit 218 and a power supply 220. According to one implementation, orientation detector 212 further comprises an illumination detector 213 installed on a top surface of the panel. The communication unit 218 comprises a first means of the short range communication and a second means of communicating with an existing communication network such as the Internet. The short range communication means conforms to the same communication standard (s) as the communication unit 208 of the solar panel 102. The communication unit 218 of the control device 108 and the communication unit 208 of the solar panel 102 may form an ad hoc communication network.

Figure 3:
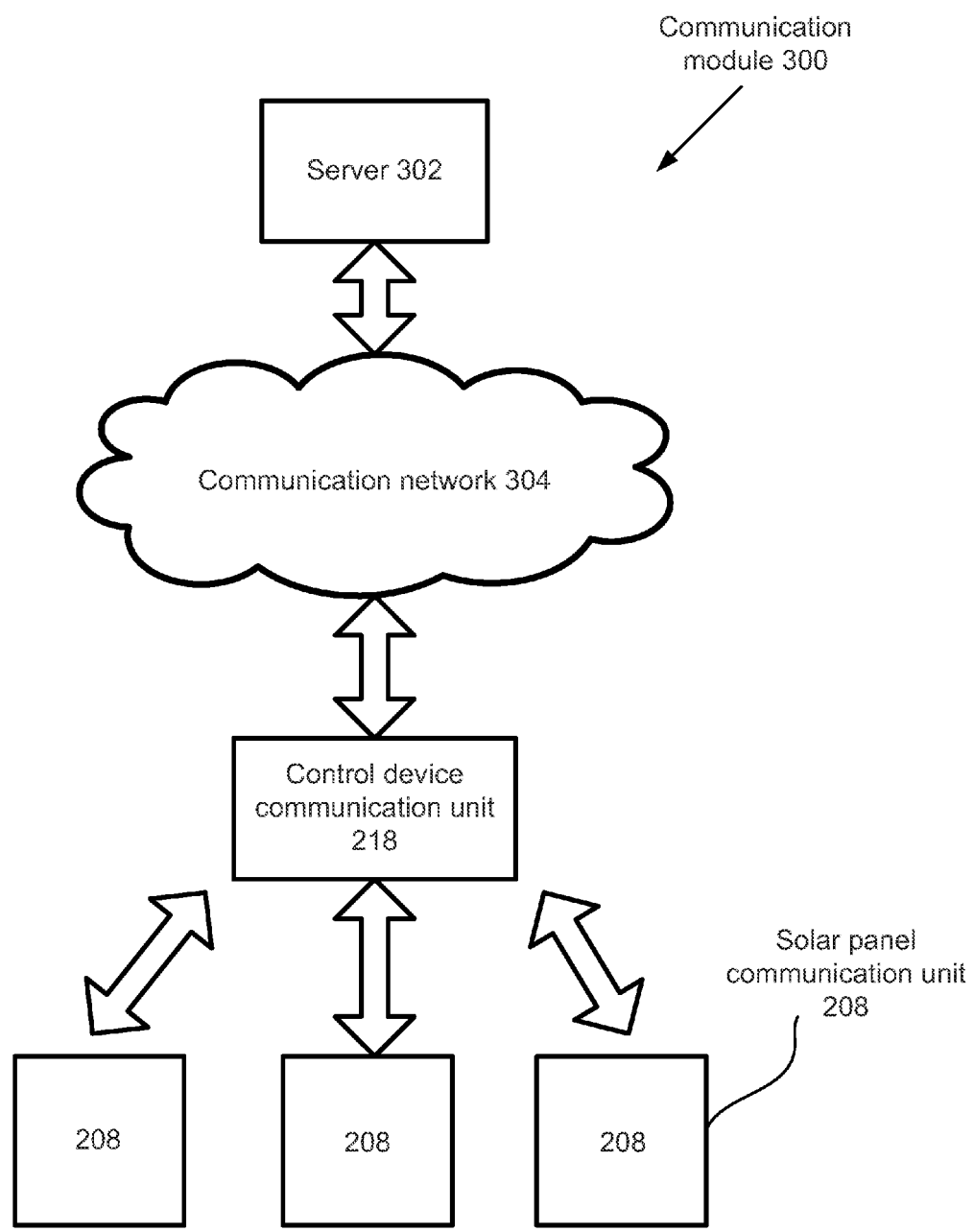
FIG. 3 is a schematic diagram of an exemplary communication module of the solar energy collection system with the control device communicating to each solar panel in a parallel manner.

FIG. 3 is a schematic diagram of an exemplary communication module 300 of the solar energy collection system 100 with the control device 106 as the communication gateway for the system. The communication unit 218 communicates to the communication unit 208 of solar panels 102 in a parallel manner. According to one embodiment of the communication module 300, the first communication means of 218 of the control device communicates to each communication unit 208 of solar panel 102 directly. The information such as the optimized orientation for generating highest electrical power at a particular time of the day can be transmitted to each panel through 218/208. On the other hand, the operation status of each panel 102 can be collected and be transmitted to the control device 106 through 208/218. The communication paths are bi-directional. The solar energy collection system 100 may be connected by the use of the second communication means of 218 to a server 302 through an existing communication network 304. The network 304 may be the Internet. The network 304 may also be a private communication network.

There are numerous derivative implementations of present inventive concept. All such derivatives are fall into the spirit of the present inventive concept. In an exemplary case, a server 302 may be connected to the communication unit 208/218 directly and be a part of the ad hoc communication network. The server 302 may be connected to other servers in the Internet or to other communication networks.

Figure 4:
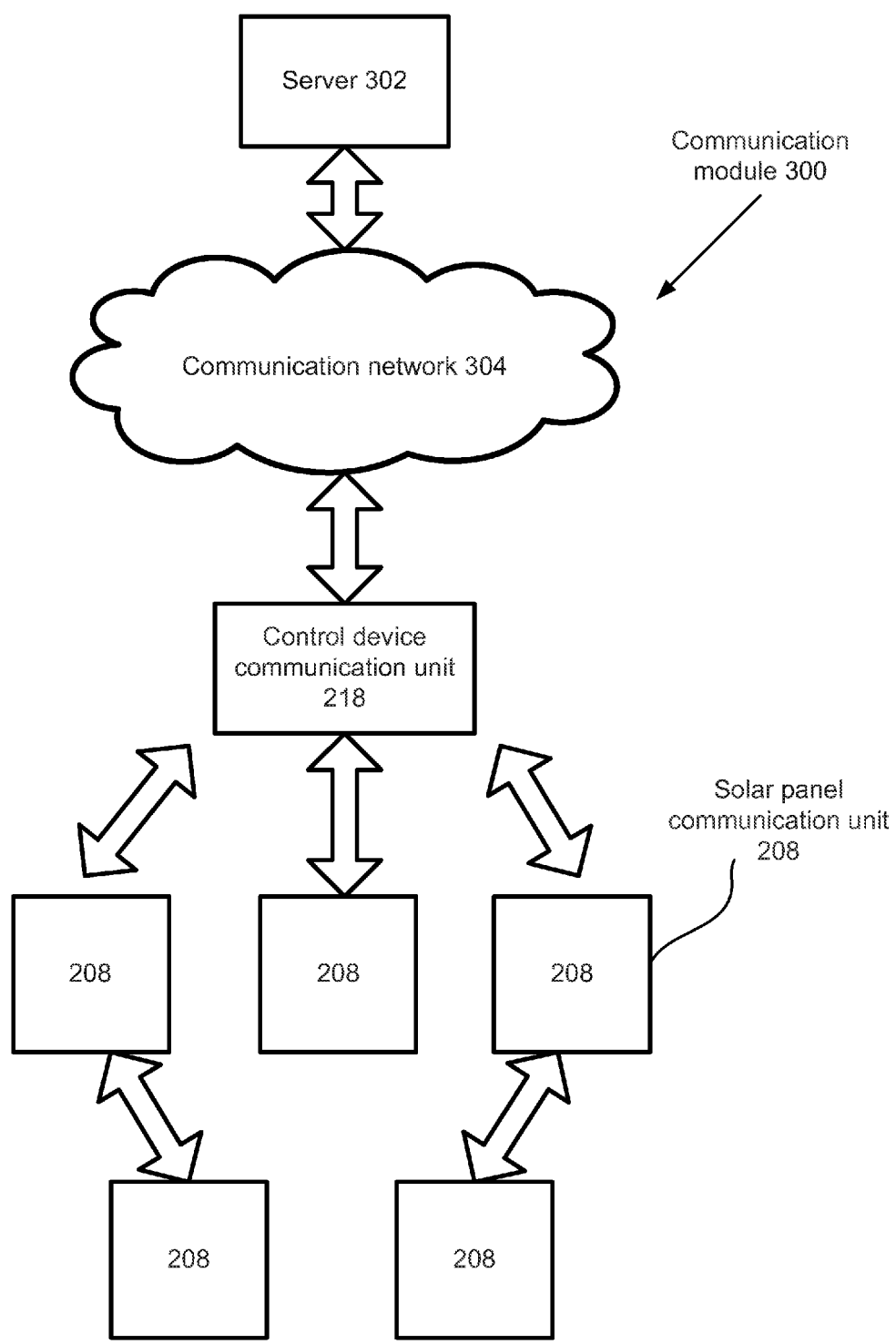
FIG. 4 is a schematic diagram of another exemplary communication module of the solar energy collection system with the control device communicating to a solar panel through yet another solar panel.

FIG. 4 is a schematic diagram of another exemplary case of the communication module 300 of the solar energy collection system 100. Some of the solar panel communication units 208 may communicate to the communication unit 218 directly. Some of other communication units 208 may communicate to 218 through one or several communication unit 208 as is typical for an ad hoc communication network.

Figure 5:
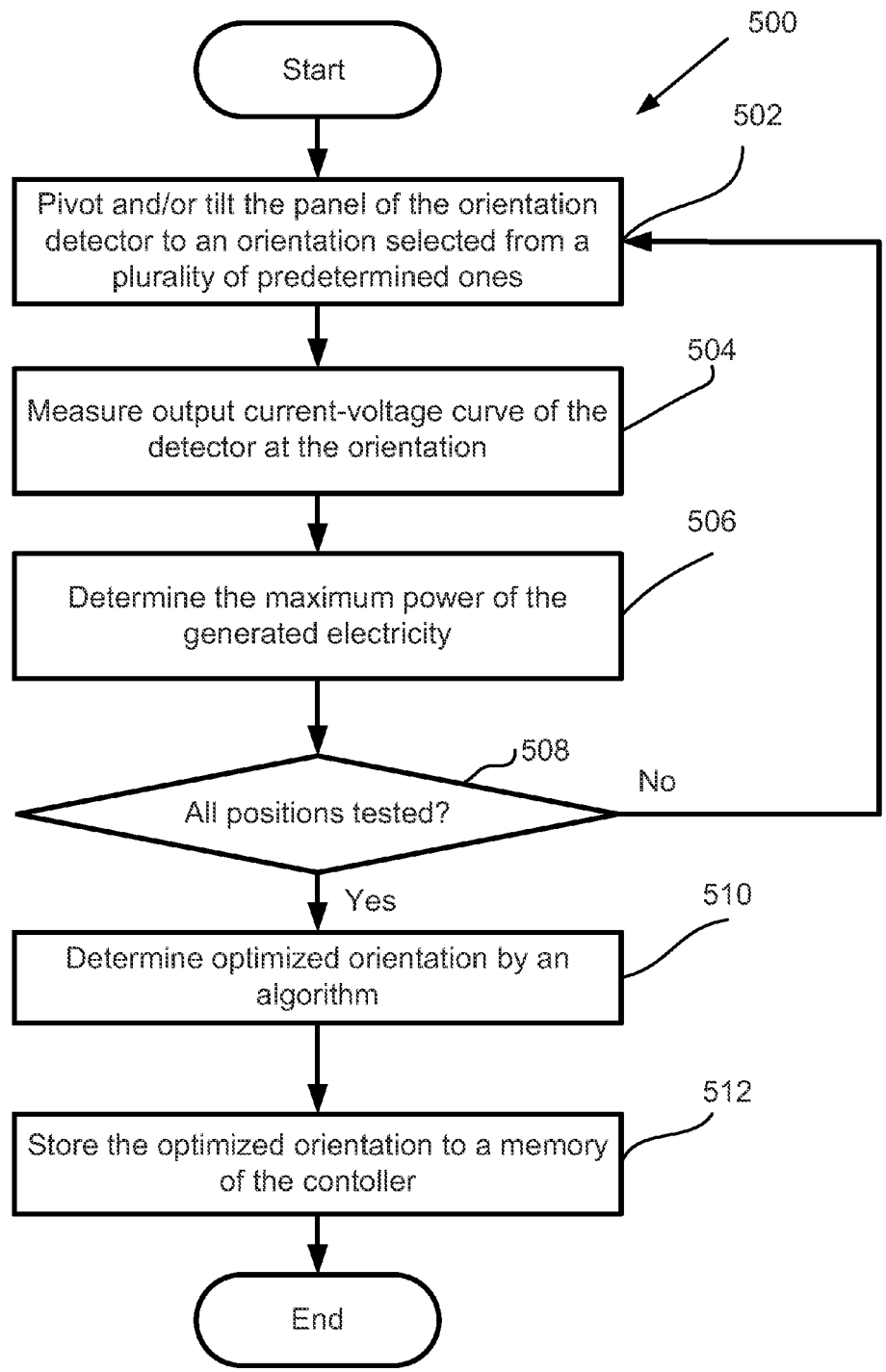
FIG. 5 is a flow diagram depicting steps of operations of determining the optimized orientation by the control device.

According to one embodiment of the present invention, the optimized orientation of the panel towards the sun can be determined by measuring of maximum power at multiple orientations. FIG. 5 is a flow diagram depicting steps of operations of determining the optimized orientation for a panel of the control device 106. A plurality of orientations may have been predetermined and stored in the controller 216 of the control device 106. The orientations may also be determined in a real time base by the controller 216. Process 500 starts with step 502 that the panel of the control device is pivoting and/or tilting to a predetermined orientation through a drive mechanism. Current and voltage relationship is then measured by a measurement unit within a preset operation range and may be recorded in a memory of the controller 216 according to step 504. The maximum power point for the specific orientation is determined and is recorded in step 506. Steps 502 to 506 are repeated until all predetermined orientations are tested. If it is verified in step 508 that all predetermined orientations have been tested, the optimized one is then determined based upon a predetermined algorithm in step 510. According to one aspect of the present invention, the optimized orientation may be determined by comparing each maximum power for each orientation and by selecting the orientation corresponding to the highest maximum power. According to another aspect of the present invention, the optimized orientation may also be determined by a more elaborate algorithm by plotting the maximum power at each orientation against their coordinates. The optimized one can then be extrapolated based upon an algorithm for finding the peak value of the plot. The method is well know in the art and can be implemented by a computing program and be executed by the controller 216. In another implementation, the collected data may be sent to the server 302 through 304. The optimized orientation may be determined by the server 302 and be sent back to the control device 106. The optimized orientation is then stored in a memory of the controller 216.

Figure 6:
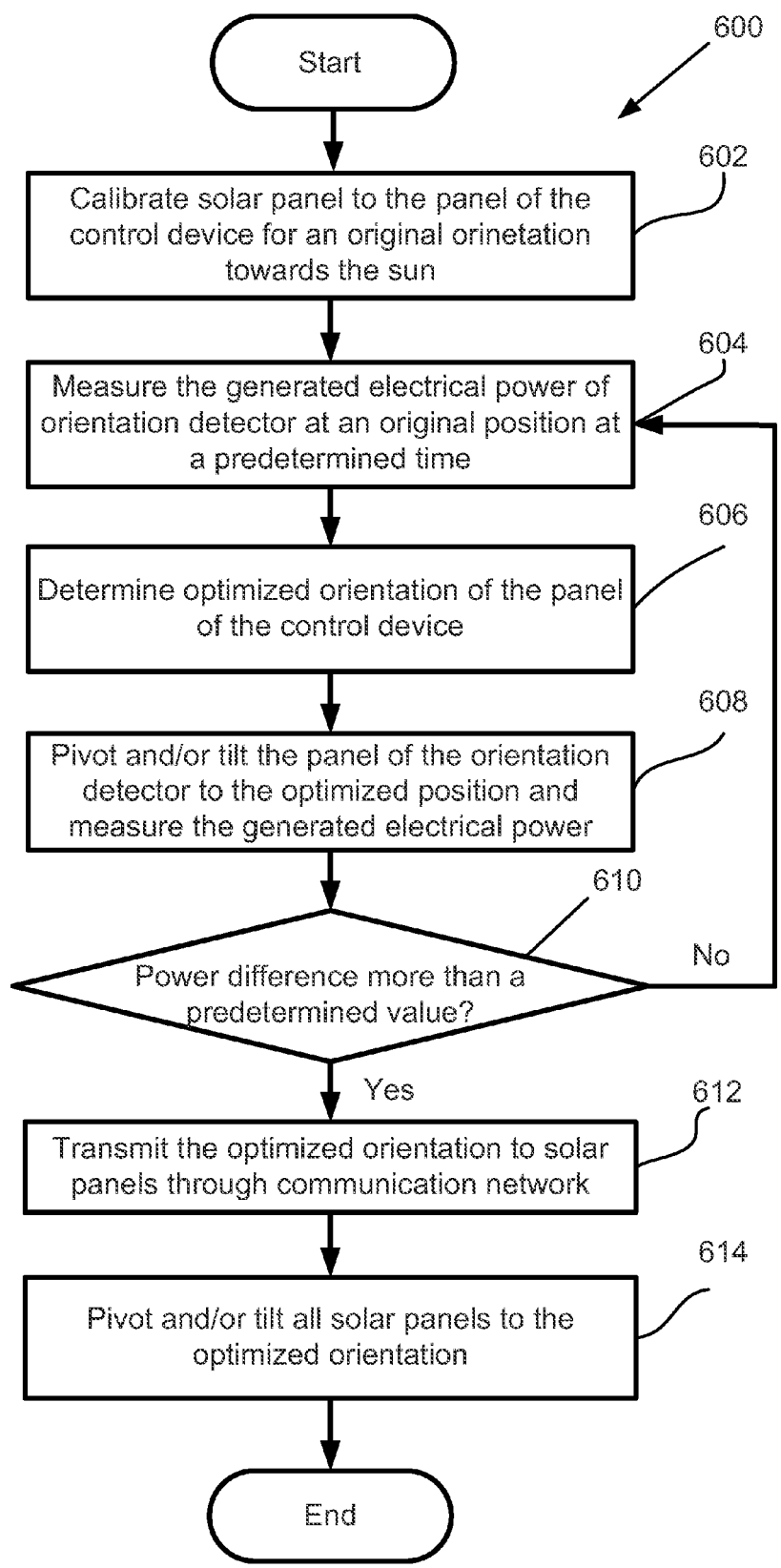
FIG. 6 is a flow diagram depicting steps of operations that the optimized orientations for all solar panels in the array are determined.

FIG. 6 is a flow diagram depicting steps of operations that the optimized orientations for all solar panels in the array are determined by the use of the ad hoc communication network formed by the communication units 208/218. Process 600 starts with step 602 that each solar panel 102 is calibrated to the panel of the control device 106 for an original position. The calibration step ensures that when the optimized orientation for the panel of the control device 106 is determined, the position for each solar panel 102 can be derived accurately from the received data file. The generated electrical power of the detector is measured at an orientation reflecting the solar panel's orientation in step 604. The optimized position is then determined based on the method described in process 500 in step 606. The panel of the orientation detector is rotated to the optimized orientation and the generated power is measured in step 608. The difference of the generated power between the optimized position and the position reflecting solar panel's position is calculated. In step 610, if the difference is more than a predetermined value, the optimized orientation is sent to all solar panels 102 in step 612 and all solar panels 102 are rotated to the optimized orientation in step 614. Otherwise, the steps from 604 to 610 will be repeated in a predetermined time interval.

Figure 7:
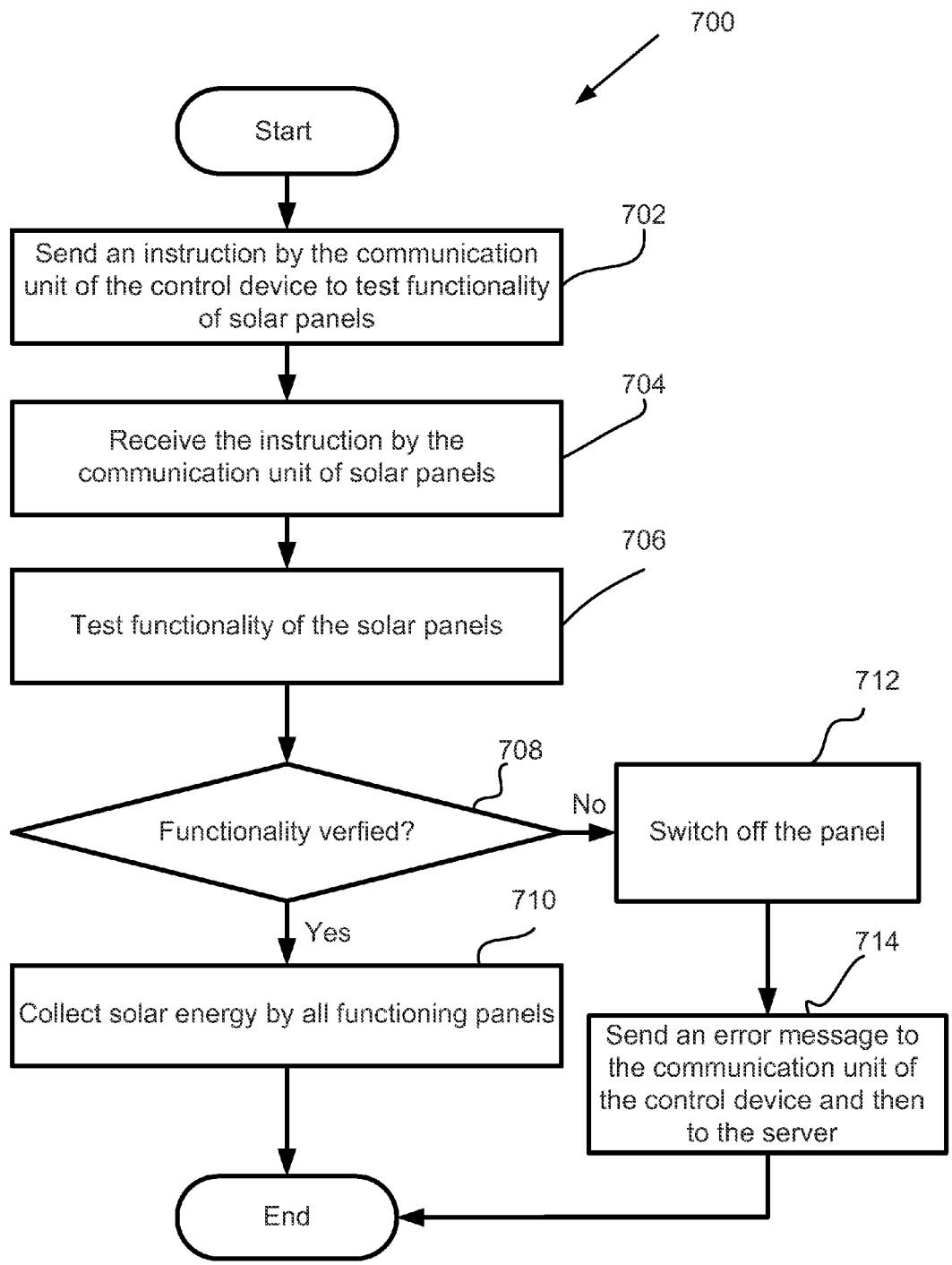
FIG. 7 is a flow diagram depicting steps of operations that functionality of panels are tested and are communicated to the server in the communication network through the control device.

FIG. 7 is a flow diagram depicting steps of operations that functionality of panels is tested and communicated to the server 302 connected to the communication network 304. Process 700 starts with step 702 that an instruction for testing functionality is sent out from the communication unit 218 of the control device 106 through the ad hoc communication network. In step 704, the instruction is received by the communication unit 208 of each solar panel 102. The controller 206 in 102 controls an operation of testing functionality in step 706. The testing may be a simple operation of measuring of the output current and voltage of the panel. The testing may involve more completed tasks as instructed by the server 302 through the control device 106. If the functionality is verified as normal in step 708, the operation of converting solar energy into the electricity will be started or be continued in step 710. If the functionality test is judged as a failure in step 708, the fault panel may be switched off in step 712 and an error message is sent to the controller 216 through 208/218. The error messages may be further sent to the server 302 through the network 304. A data file indicating the normality of the solar panels may also be sent to the control device 106 and to the server 302 in a similar manner. The operational status of the panel 102 may also be collected and be sent to the server 302 through the network 304.

The invention claimed is:

1. A method of generating highest electrical power from a solar energy collection system comprising a plurality of solar panels and a control device, the method comprising:
   (a) determining the optimized orientation towards the sun for generating the highest electrical power based upon an illumination detector installed on a top surface of a panel of a control device;
   (b) transmitting a data file including determined optimized orientation to the solar panels by an ad hoc communication network formed by solar panel communication units and a control device communication unit;
   (c) pivoting and/or tilting the solar panels to the optimized orientations based upon the received data file; and
   (d) generating electrical power by the solar panels.

2. The method as recited in claim 1, wherein said method further comprising a step of calibrating original orientations of the solar panels to an original orientation of the panel of the control device.

3. The method as recited in claim 1, wherein the ad hoc communication network conforming to a standard or a combination of standards from the following group:
   (a) ZigBee (IEEE 802.15.4 and its amendments);
   (b) Bluetooth (IEEE 802.11b and its amendments); and
   (c) WiFi (IEEE 802.11 and its amendments).

4. The method as recited in claim 1, wherein said solar energy collection system further comprising a means of communicating with an existing network through the control device.

5. The method as recited in claim 4, wherein said existing communication network comprising the Internet.

6. The method as recited in claim 1, wherein said method further comprising:
   (a) testing functionality of at least one of the solar panels after receiving an instruction by the solar panel communication unit from the control device communication unit; and
   (b) sending test results to a server through the control device communication unit.

7. A control device of a solar energy collection system comprising:
   (a) an illumination detector installed on a top surface of a panel;
   (b) a supporting, pivoting and tilting mechanism;
   (c) a controller;
   (d) a communication unit; and
   (e) a power supply,
   wherein said device providing a means of determining of an orientation for the panel to receive the maximum sun radiation.

8. The device as recited in claim 7, wherein said means of determining of the orientation further comprising a means of measuring maximum generated electrical power at a plurality of predetermined orientations and deriving the optimized orientation accordingly, wherein the orientation is changeable by pivoting and/or tilting the panel controlled by the controller.

9. The device as recited in claim 8, wherein said illumination detector is a solar cell or a plurality of solar cells connected in a predetermined scheme.

10. The device as recited in claim 7, wherein said communication unit further comprises a first transceiver for connecting to an ad hoc communication network and a second transceiver for connecting to an existing communication network.

11. The device as recited in claim 10, wherein said ad hoc communication network conforming to a standard or a combination of standards from the following group:
   (a) ZigBee (IEEE 802.15.4 and its amendments);
   (b) Bluetooth (IEEE 802.11b and its amendments); and
   (c) WiFi (IEEE 802.11 and its amendments).

* * * * *